United States Patent
Tang et al.

(10) Patent No.: US 12,415,215 B2
(45) Date of Patent: Sep. 16, 2025

(54) NIP ROLLER, POLE PIECE FLATTENING EQUIPMENT AND POLE PIECE PRODUCTION SYSTEM

(71) Applicant: CONTEMPORARY AMPEREX TECHNOLOGY (HONG KONG) LIMITED, Hong Kong (CN)

(72) Inventors: Zhenguang Tang, Fujian (CN); Hongwu Shang, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 356 days.

(21) Appl. No.: 18/108,714

(22) Filed: Feb. 13, 2023

(65) Prior Publication Data

US 2023/0256488 A1 Aug. 17, 2023

(30) Foreign Application Priority Data

Feb. 14, 2022 (CN) .......................... 202220294456.3

(51) Int. Cl.
  *B21B 27/02* (2006.01)
(52) U.S. Cl.
  CPC ........ *B21B 27/021* (2013.01); *B21B 2263/04* (2013.01)
(58) Field of Classification Search
  CPC .................................................... B21B 27/021
  USPC .......................................... 492/1, 28, 30, 36
  See application file for complete search history.

(56) References Cited

U.S. PATENT DOCUMENTS

| | | | | |
|---|---|---|---|---|
| 4,021,894 A | * | 5/1977 | Poterala | D06C 3/06 26/105 |
| 4,760,947 A | * | 8/1988 | Paquin | B65H 23/0256 72/203 |
| 5,129,876 A | * | 7/1992 | Brabant | B65H 45/147 492/30 |

FOREIGN PATENT DOCUMENTS

| | | | |
|---|---|---|---|
| CN | 205752126 U | * | 11/2016 |
| CN | 206345520 U | | 7/2017 |
| CN | 211968398 U | | 11/2020 |
| CN | 112517635 A | | 3/2021 |

(Continued)

OTHER PUBLICATIONS

English Machine Translation of CN-205752126-U (Year: 2016).*
Extended European Search Report dated Jul. 3, 2023 received in European Patent Application No. EP 23156056.6.

*Primary Examiner* — Sarang Afzali
(74) *Attorney, Agent, or Firm* — Scully, Scott, Murphy & Presser, P.C.

(57) ABSTRACT

The present application discloses a nip roller, pole piece flattening equipment and a pole piece production system. The nip roller includes: a roller body. The side surface of the roller body is provided with a plurality of ridges. Each ridge is provided with a first part and a second part, where the first part is provided with part of first threads, the second part is provided with part of second threads, and a rotation direction of the first threads is opposite to that of the second threads; rotation directions of the first threads are the same, and rotation directions of the second threads are the same; and plurality of ridges are sequentially arranged at intervals in a rotation direction of the roller body, lead angles of the first threads on the first parts are sequentially decreased, and lead angles of the second threads on the second parts are sequentially decreased.

19 Claims, 2 Drawing Sheets

(56) References Cited

FOREIGN PATENT DOCUMENTS

| CN | 214719523 U | 11/2021 |
| CN | 214898503 U | 11/2021 |

\* cited by examiner

NIP ROLLER, POLE PIECE FLATTENING EQUIPMENT AND POLE PIECE PRODUCTION SYSTEM

CROSS-REFERENCE TO RELATED APPLICATION

This application claims priority to Chinese Patent Application No. 202220294456.3, filed on Feb. 14, 2022, which is hereby incorporated by reference in its entirety.

TECHNICAL FIELD

The present application relates to the technical field of battery manufacturing, in particular to a nip roller, pole piece flattening equipment and a pole piece production system.

BACKGROUND

With energy conservation and emission reduction being the key to the sustainable development of automobile industry, electric vehicles have become an important part of the sustainable development of automobile industry due to their advantages in energy conservation and environmental protection. For the electric vehicles, a battery technology is an important factor related to their development.

Pole pieces in a battery are prone to wrinkles during production. In order to avoid wrinkling of the pole pieces during production, the pole pieces are often flattened by a nip roller. However, the existing nip roller does not have a good flattening effect when flattening the pole pieces, which causes wrinkling of the pole pieces during production.

SUMMARY

In view of the above problems, the present application provides a nip roller, pole piece flattening equipment and a pole piece production system. The nip roller provided by the present application can better flatten a pole piece, thereby further reducing or even eliminating the occurrence of pole piece wrinkling during pole piece production.

In a first aspect, the present application provides a nip roller including: a roller body. The side surface of the roller body is provided with a plurality of ridges protruding in a radial direction of the roller body, and extension directions of the plurality of ridges are all parallel to an axial direction of the roller body; each ridge is provided with a first part and a second part which are sequentially arranged in the extension direction of the ridge, where a surface, away from the axis of the roller body, of the first part is provided with part of first threads, a surface, away from the axis of the roller body, of the second part is provided with part of second threads, and a rotation direction of the first threads is opposite to that of the second threads; the first threads on the first parts of the ridges are the same in rotation direction, and the second threads on the second parts of the ridges are the same in rotation direction, where the plurality of ridges are sequentially arranged at intervals in a rotation direction of the roller body, lead angles of the first threads on the first parts located on the plurality of ridges sequentially arranged at intervals are sequentially decreased, and lead angles of the second threads on the second parts located on the plurality of ridges sequentially arranged at intervals are sequentially decreased.

In the technical solution of the embodiment of the present application, each ridge is provided with the first part and the second part which are sequentially arranged in the extension direction of the ridge, where the surface, away from the axis of the roller body, of the first part is provided with part of the first threads, the surface, away from the axis of the roller body, of the second part is provided with part of the second threads, and the rotation direction of the first threads is opposite to that of the second threads; and the plurality of ridges are sequentially arranged at intervals in the rotation direction of the roller body, the lead angles of the first threads on the first parts located on the plurality of ridges sequentially arranged at intervals are sequentially decreased, and the lead angles of the second threads on the second parts located on the plurality of ridges sequentially arranged at intervals are sequentially decreased. Accordingly, since the rotation direction of the first threads is opposite to that of the second threads, when the nip roller flattens the pole piece, a direction of force applied by the first threads to the pole piece and a direction of force applied by the second threads to the pole piece are directions away from each other, thereby driving the pole piece to be in a flattened state; and the lead angles of the first threads on the first parts located on the plurality of ridges sequentially arranged at intervals are sequentially decreased, the lead angles of the second threads on the second parts located on the plurality of ridges sequentially arranged at intervals are sequentially decreased, and thus when the nip roller flattens the pole piece, gradually-increased flattening force can be provided to the pole piece, thereby improving a flattening effect of the nip roller so that the nip roller can well flatten the pole piece, and accordingly, the occurrence of pole piece wrinkling during pole piece production can be further reduced or even eliminated.

In some embodiments, dimensions of the first threads and the second threads in the radial direction of the roller body are all 1 μm-5 μm. Accordingly, in a process of using the nip roller to flatten the pole piece, when the first threads and the second threads make contact with the pole piece, friction force generated between the first threads and the pole piece and between the second threads and the pole piece can be increased, thereby better flattening the pole piece, and ensuring that no marks are produced by the first threads and the second threads on the pole piece.

In some embodiments, in any ridge, a dimension of the first part in the extension direction of the ridge is 0.6-1 times of a dimension of the second part in the extension direction of the ridge; and/or, in any ridge, the lead angles of the first threads on the first part are greater than those of the second threads on the second part. Accordingly, when the nip roller needs to be utilized for flattening an asymmetric pole piece, the first threads on the first parts can be utilized for flattening the side, with tabs, of the pole piece, and the second threads on the second parts are utilized for flattening the other side of the pole piece so as to better flatten the asymmetric pole piece.

In some embodiments, in any ridge, a dimension of the first part in the extension direction of the ridge is equal to that of the second part in the extension direction of the ridge; and/or, in any ridge, the lead angles of the first threads on the first part are equal to those of the second threads on the second part. Accordingly, when the nip roller needs to be utilized for flattening the asymmetric pole piece, the two sides of the pole piece can be flattened by the first threads on the first parts and the second threads on the second parts respectively, so that flattening force exerted on the two sides of the pole piece tends to be the same, thereby better flattening the asymmetric pole piece.

In some embodiments, in any ridge, a maximum interval between the surfaces, away from the axis of the roller body, of the first threads and the axis of the roller body is a first interval, a maximum interval between the surfaces, away from the axis of the roller body, of the second threads and the axis of the roller body is a second interval, and the first interval is equal to the second interval. Accordingly, in the process of flattening the pole piece by the nip roller, after the pole piece makes contact with the first threads and the second threads of any ridge, intervals between contact positions of the pole piece and the ridge and the axis of the roller body tend to be the same, thereby ensuring that the nip roller has a good flattening effect.

In some embodiments, maximum intervals between the outer surfaces, away from the axis of the roller body, of different first threads and the axis of the roller body are the same, and maximum intervals between the outer surfaces, away from the axis of the roller body, of different second threads and the axis of the roller body are the same. Accordingly, in the process of flattening the pole piece by the nip roller, intervals between the contact positions of the pole piece and the nip roller and the axis of the roller body can be kept unchangeable, thereby avoiding nip roller flattening effect reduction caused by shaking of the pole piece in the flattening process.

In some embodiments, in any ridge, the outer surface, away from the axis of the roller body, of the ridge is a cambered surface, and intervals between all parts of the cambered surface and the axis of the roller body are the same. Accordingly, in the process of flattening the pole piece by the nip roller, a time ratio when the pole piece makes contact with the ridges can be increased within unit time, thereby further improving the flattening effect of the nip roller.

In some embodiments, the plurality of first parts are sequentially arranged at intervals in a circumferential direction of the roller body; and the plurality of second parts are sequentially arranged at intervals in the circumferential direction of the roller body. Accordingly, in the process of flattening the pole piece by the nip roller, positions, where the pole piece is flattened, of the first threads on the plurality of first parts can be the same, positions, where the pole piece is flattened, of the second threads on the plurality of second parts can be the same, and thus, in the pole piece flattening process, stress of the pole piece is more stable, thereby improving the flattening effect of the nip roller.

In a second aspect, the present application provides pole piece flattening equipment including the nip roller in the above embodiments.

In a third aspect, the present application provides a pole piece production system including the pole piece flattening equipment in the above embodiments.

The above description is only a summary of the technical solutions of the present application. In order to understand the technical means of the present application more clearly, the technical means can be implemented according to the content of the specification. Furthermore, to make the above content and other objectives, features and advantages of the present application more comprehensible, specific implementation modes of the present application are exemplified below.

DESCRIPTION OF DRAWINGS

By reading the detailed description of the preferred implementations below, various other advantages and benefits will become apparent to those of ordinary skill in the art. The drawings are only used for illustrating the preferred embodiments and are not to be considered a limitation to the present application. Moreover, in all of the drawings, the same parts are indicated by the same reference numerals. In the drawings.

Figure 1:
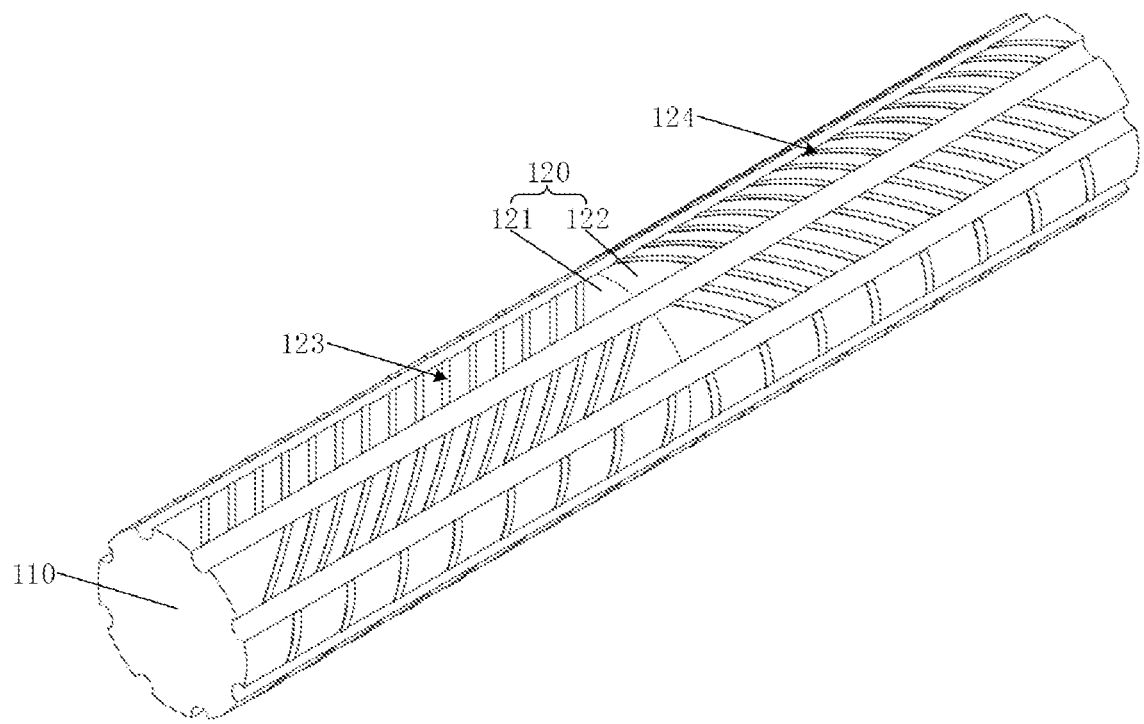
FIG. 1 is a structural schematic diagram of a nip roller according to some embodiments of the present application.

In the drawings, the drawings are not drawn to actual scale.

Reference numerals in specific embodiments are as follows:

110—roller body;
120—ridge, 121—first part, 122—second part, 123—first thread, and 124—second thread.

It needs to be explained that in the drawings, dotted lines are only used for dividing structures of the nip roller rather than indicating a surface structure of the nip roller.

DETAILED DESCRIPTION

Embodiments of technical solutions of the present application are described in detail below in conjunction with drawings. The following embodiments are only used for more clearly illustrating the technical solutions of the present application, and therefore are only used as examples but cannot be used for limiting the scope of protection of the present application.

Unless otherwise defined, all technical and scientific terms used herein have the same meaning as commonly understood by those skilled in the art belonging to the technical field of the present application; the terms used herein are only for the purpose of describing the specific embodiments and are not intended to limit the present application; the terms "including" and "having" and any variations thereof in Specification and Claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", "circumferential direction", etc. are based on the orientation or position relationship shown in the drawings and are intended to facilitate the description of the embodiments of the present application and simplify the description only, rather than indicating or implying that a device or element referred to must have a particular orientation or be constructed and operated in a particular orientation, and therefore are not to be understood as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integrated connection; a mechanical connection, or an electrical connection; a direct connection, an indirect connection through an intermediate medium, an internal connection of two elements, or interaction between two elements. Those ordinary skill in the art can understand specific meanings of the above terms in embodiments of the present application according to specific situations.

At present, from the perspective of the development of the market situation, batteries are more and more widely used. The batteries are used in energy storage power source systems such as hydraulic, thermal, wind and solar power stations as well as in electric vehicles such as electric bicycles, electric motorcycles and electric cars, and military equipment and aerospace fields. With continuous expansion of battery application fields, the market demand is also constantly expanding.

Pole pieces of the existing batteries are prone to wrinkles during production. In order to avoid wrinkling of the pole pieces during production, the pole pieces are often flattened by a nip roller. However, the existing nip roller does not have a good flattening effect when flattening the pole pieces, which causes wrinkling of the pole pieces during production.

In order to improve the flattening effect of the nip roller during pole piece flattening so as to further reduce or even eliminate the occurrence of pole piece wrinkling during production of the pole pieces, the inventor of the present application found that two kinds of threads with opposite rotation directions can be arranged on the nip roller, and when the nip roller flattens one pole piece, directions of flattening force provided by the two kinds of threads to the pole piece are directions away from each other, thereby driving the pole piece to expand from a center of the pole piece to both sides, so that the pole piece is in a flattened state; and threads with gradually-decreased lead angles are arranged on a side surface of the nip roller to provide gradually-increased flattening force for the pole piece when the nip roller flattens the pole piece, thereby improving the flattening effect of the nip roller so that the nip roller can better flatten the pole piece, and accordingly the occurrence of pole piece wrinkling during pole piece production can be further reduced or even eliminated.

Based on the above considerations, in order to improve the flattening effect of the nip roller during pole piece flattening so as to further reduce or even eliminate the occurrence of pole piece wrinkling during pole piece production, the inventor of the present application has conducted in-depth research and designed a nip roller. A rotation direction of first threads of ridges arranged on a side surface of the nip roller is opposite to a rotation direction of second threads of the ridges arranged on the side surface of the nip roller, and thus when the nip roller flattens the pole piece, a direction of force applied by the first threads to the pole piece and a direction of force applied by the second threads to the pole piece are directions away from each other, thereby driving the pole piece to be in a flattened state; lead angles of the first threads on first parts of the plurality of ridges sequentially arranged at intervals are decreased successively, lead angles of the second threads on second parts of the plurality of ridges sequentially arranged at intervals are decreased successively, and thus, when the nip roller flattens the pole piece, gradually-increased flattening force is provided to the pole piece, thereby improving the flattening effect of the nip roller so that the nip roller can better flatten the pole piece, and accordingly, the occurrence of pole piece wrinkling during pole piece production can be further reduced or even eliminated.

Refer to FIG. 1 to FIG. 4. According to some embodiments of the present application, the present application provides a nip roller including: a roller body 110. A side surface of the roller body 110 is provided with a plurality of ridges 120 protruding in a radial direction of the roller body 110, and an extension direction of the plurality of ridges 120 is parallel to an axial direction of the roller body 110; each ridge 120 is provided with a first part 121 and a second part 122 which are sequentially arranged in the extension direction of the ridge, where a surface, away from the axis of the roller body 110, of the first part 121 is provided with part of first threads 123, a surface, away from the axis of the roller body 110, of the second part 122 is provided with part of second threads 124, and a rotation direction of the first threads 123 is opposite to that of the second threads 124; the first threads 123 on the first parts 121 of the ridges 120 are the same in rotation direction, and the second threads 124 on the second parts 122 of the ridges 120 are the same in rotation direction, where the plurality of ridges 120 are sequentially arranged at intervals in a rotation direction of the roller body 110, lead angles of the first threads 123 on the first parts 121 located on the plurality of ridges 120 sequentially arranged at intervals are sequentially decreased, and lead angles of the second threads 124 on the second parts 122 located on the plurality of ridges 120 sequentially arranged at intervals are sequentially decreased.

Since the surfaces, away from the axis of the roller body 110, of the first parts 121 do not completely cover the side surface of the roller body 110 in a circumferential direction of the roller body 110, when the threads are formed on the surfaces, away from the axis of the roller body 110, of the first parts 121, incomplete threads are formed. That is, when the first threads 123 are formed on the surfaces, away from the axis of the roller body 110, of the first parts 121, part of first threads 123 are formed.

Correspondingly, since the surfaces, away from the axis of the roller body 110, of the second parts 122 do not completely cover the side surface of the roller body 110 in the circumferential direction of the roller body 110, when the threads are formed on the surfaces, away from the axis of the roller body 110, of the second parts 122, incomplete threads are formed as well. That is, when the second threads 124 are formed on the surfaces, away from the axis of the roller body 110, of the second parts 122, part of second threads 124 are formed.

When ends, away from the second parts 122, of the first threads 123 on the first parts 121 serve as screw-in ends of the first threads 123, a screw-out direction of the first threads 123 is a rotation direction of the nip roller during pole piece flattening.

The side surface of the roller body 110 is provided with the plurality of ridges 120 protruding in the radial direction of the roller body 110, the extension directions of the plurality of ridges 120 are all parallel to the axial direction of the roller body 110, and in any ridge 120, the ridge 120 is provided with the first part 121 and the second part 122 sequentially arranged in the extension direction of the ridge 120, the surfaces, away from the axis of the roller body 110, of the first parts 121 are provided with part of the first threads 123, and the surfaces, away from the axis of the roller body 110, of the second parts 122 are provided with part of the second threads 124, so that when the nip roller flattens the pole piece, outer surfaces, away from the axis of the roller body 110, of the part of first threads 123 of the first parts 121 arranged on the plurality of ridges 120 and outer surfaces, away from the axis of the roller body 110, of the part of second threads 124 of the second parts 122 arranged on the plurality of ridges 120 make contact with the pole piece.

Since the rotation direction of the first threads 123 is opposite to that of the second threads 124, when the ends, away from the second parts 122, of the first threads 123 on the first parts 121 serve as the screw-in ends of the first threads 123, the screw-out direction of the first threads 123 is the rotation direction of the nip roller during pole piece flattening, and accordingly, when the nip roller flattens the pole piece, the direction of the force applied by the first threads 123 to the pole piece and the direction of the force applied by the second threads 124 to the pole piece are the directions away from each other, thereby driving the pole piece to be in the flattened state.

The first threads 123 on the first parts 121 of the ridges 120 are the same in rotation direction, and the second threads 124 on the second parts 122 of the ridges 120 are the same in rotation direction, and thus, when the nip roller flattens the pole piece, directions of flattening force applied, by the first threads 123 on the plurality of first parts 121, to the pile piece can be the same, directions of flattening force applied, by the second threads 124 on the plurality of second parts 122, to the pile piece can be the same, and accordingly, the pole piece can be prevented from wrinkling.

The plurality of ridges 120 are sequentially arranged at intervals in the rotation direction of the roller body 110, the lead angles of the first threads 123 on the first parts 121 located on the plurality of ridges 120 sequentially arranged at intervals are sequentially decreased, and the lead angles of the second threads 124 on the second parts 122 located on the plurality of ridges 120 sequentially arranged at intervals are sequentially decreased, and thus, when the nip roller flattens the pole piece, the gradually-increased flattening force can be supplied to the pole piece, thereby improving the flattening effect of the nip roller so that the nip roller can better flatten the pole piece, and accordingly the occurrence of pole piece wrinkling during pole piece production can be further reduced or even eliminated.

Specifically, in a process of flattening the pole piece by the nip roller, when the first threads 123 and the second threads 124 make contact with the pole piece, a dynamic friction coefficient of a position where any one kind of the first threads 123 and the second threads 124 make contact with the pole piece and a pressure generated during contact are constant values.

The smaller the lead angles of the first threads 123, the larger the number of teeth of the first threads 123 arranged on the first parts 121 becomes; at the time, when the nip roller flattens the pole piece, a contact area between the first threads 123 and the pole piece is larger; when the dynamic friction coefficient of the position where the first threads 123 make contact with the pole piece and the pressure generated during contact are all the constant values, the larger the contact area between the first threads 123 and the pole piece, the greater friction force generated between the first threads 123 and the pole piece becomes.

Therefore, the lead angles of the first threads 123 on the first parts 121 located on the plurality of ridges 120 sequentially arranged at intervals are decreased successively so that when the first threads 123 on the first parts 121 of the plurality of ridges 120 sequentially make contact with the pole piece, the gradually-increased flattening force can be supplied to the pole piece.

Correspondingly, the smaller the lead angles of the second threads 124, the larger the number of teeth of the second threads 124 arranged on the second parts 122 becomes; at the time, when the nip roller flattens the pole piece, a contact area between the second threads 124 and the pole piece is larger; when the dynamic friction coefficient of the position where the second threads 124 make contact with the pole piece and the pressure generated during contact are all the constant values, the larger the contact area between the second threads 124 and the pole piece, the greater friction force generated between the second threads 124 and the pole piece becomes.

Therefore, the lead angles of the second threads 124 on the second parts 122 located on the plurality of ridges 120 sequentially arranged at intervals are decreased successively so that when the second threads 124 on the second parts 122 of the plurality of ridges 120 sequentially make contact with the pole piece, the gradually-increased flattening force can be supplied to the pole piece.

It needs to be explained that the present application does not limit the number of the ridges 120 arranged on the side surface of the roller body 110, the specific shape of the ridges 120, the specific degrees of the lead angles of the first threads 123 on the first parts 121, and the specific degrees of the lead angles of the second threads 124 on the second parts 122.

In some embodiments, the nip roller is used for flattening a pole piece with double sides coated. At the time, the number of the ridges 120 may be eight, and the lead angles of the first threads 123 on the first parts 121 of the eight ridges 120 may be sequentially 85 degrees, 82 degrees, 79 degrees, 76 degrees, 73 degrees, 70 degrees, 67 degrees and 64 degrees, and the lead angles of the second threads 124 on the second parts 122 of the eight ridges 120 may be sequentially 85 degrees, 82 degrees, 79 degrees, 76 degrees, 73 degrees, 70 degrees, 67 degrees and 64 degrees. The pole piece with double sides coated means that both sides of the pole piece are coated with active materials. At the time, when the nip roller flattens the pole piece, the nip roller can make contact with either side of the pole piece.

In some embodiments, the nip roller is used for flattening a pole piece with a single side coated. At the time, the number of the ridges 120 may be eight, and the lead angles of the first threads 123 on the first parts 121 of the eight ridges 120 may be sequentially 80 degrees, 75 degrees, 70 degrees, 65 degrees, 60 degrees, 55 degrees, 50 degrees and 45 degrees, and the lead angles of the second threads 124 on the second parts 122 of the eight ridges 120 may be sequentially 80 degrees, 75 degrees, 70 degrees, 65 degrees, 60 degrees, 55 degrees, 50 degrees and 45 degrees. The pole piece with a single side coated means that only one side of the pole piece is coated with active materials. At the time, when the nip roller flattens the pole piece, the nip roller makes contact with the side, not coated with the active materials, of the pole piece, and accordingly, when the nip roller flattens the pole piece, the nip roller can be prevented from damaging the active materials applied to the pole piece. Since the nip roller makes contact with the side, not coated with the active materials, of the pole piece, compared with contact between the nip roller and the side, coated with the active materials, of the pole piece, a dynamic friction coefficient of contact between the nip roller and the side, not coated with the active materials, of the pole piece is small, and accordingly, friction force when the nip roller makes contact with the side, not coated with the active materials, of the pole piece can be increased by reducing the lead angles of the threads, thereby making the nip roller have a good flattening effect.

Refer to FIG. 1 to FIG. 4. According to some embodiments of the present application, dimensions of the first threads 123 and the second threads 124 in the radial direction of the roller body 110 are all 1 μm-5 μm (μm: micron).

Accordingly, in the process of using the nip roller to flatten the pole piece, since the dimensions of the first threads 123 and the second threads 124 in the radial direction of the roller body 110 are all greater than 1 μm, when the first threads 123 and the second threads 124 make contact with the pole piece, friction force generated between the first threads 123 and the pole piece and between the second threads 124 and the pole piece can be increased, thereby better flattening the pole piece; and since the dimensions of the first threads 123 and the second threads 124 in the radial direction of the roller body 110 are all less than 5 μm, it can be ensured that no marks are produced on the pole piece after the first threads 123 and the second threads 124 make contact with the pole piece.

Refer to FIG. 1 to FIG. 4. According to some embodiments of the present application, in any ridge 120, a dimension of the first part 121 in the extension direction of the ridge 120 is 0.6-1 times of a dimension of the second part 122 in the extension direction of the ridge 120; and/or, in any ridge 120, the lead angles of the first threads 123 on the first part 121 are greater than those of the second threads 124 on the second part 122.

The side, with tabs, of an asymmetric pole piece has a larger mass, and thus when the side, with the tabs, of the pole piece is flattened, required flattening force is also relatively large. Thus, when the nip roller needs to be utilized for flattening the asymmetric pole piece, the first threads 123 on the first parts 121 can be utilized for flattening the side, with the tabs, of the pole piece so as to provide large flattening force; and the second threads 124 on the second parts 122 are utilized for flattening the other side of the pole piece so as to better flatten the asymmetric pole piece.

The asymmetric pole piece means that only one side of the pole piece is provided with the tabs, so that a surface area of the side, with tabs, of the pole piece is greater than that of the side, without tabs, of the pole piece, so that the pole piece is asymmetrical.

Refer to FIG. 1 to FIG. 4. According to some embodiments of the present application, in any ridge 120, a dimension of the first part 121 in the extension direction of the ridge 120 is equal to that of the second part 122 in the extension direction of the ridge 120; and/or, in any ridge 120, the lead angles of the first threads 123 on the first part 121 are equal to those of the second threads 124 on the second part 122.

Accordingly, when the nip roller needs to be utilized for flattening the asymmetric pole piece, the two sides of the pole piece can be flattened by the first threads 123 on the first parts 121 and the second threads 124 on the second parts 122 respectively, so that flattening force exerted on the two sides of the pole piece tends to be the same, thereby better flattening the asymmetric pole piece.

Where the so-called symmetric pole piece is: both sides of the pole piece are provided with tabs, so that the shape and even the surface area of both sides of the pole piece are the same, so that the pole piece is symmetrical.

Refer to FIG. 1 to FIG. 4. According to some embodiments of the present application, in any ridge 120, a maximum interval between the surfaces, away from the axis of the roller body 110, of the first threads 123 and the axis of the roller body 110 is a first interval, a maximum interval between the surfaces, away from the axis of the roller body 110, of the second threads 124 and the axis of the roller body 110 is a second interval, and the first interval is equal to the second interval.

Accordingly, in the process of flattening the pole piece by the nip roller, after the pole piece makes contact with the first threads 123 and the second threads 124 of any ridge 120, intervals between contact positions of the pole piece and the ridge 120 and the axis of the roller body 110 tend to be the same, thereby ensuring that the nip roller has a good flattening effect.

Refer to FIG. 1 to FIG. 4. According to some embodiments of the present application, maximum intervals between the outer surfaces, away from the axis of the roller body 110, of different first threads 123 and the axis of the roller body 110 are the same, and maximum intervals between the outer surfaces, away from the axis of the roller body 110, of different second threads 124 and the axis of the roller body 110 are the same.

Accordingly, in the process of flattening the pole piece by the nip roller, intervals between the contact positions of the pole piece and the nip roller and the axis of the roller body 110 can be kept unchangeable, thereby avoiding nip roller flattening effect reduction caused by shaking of the pole piece in the flattening process.

Figure 2:
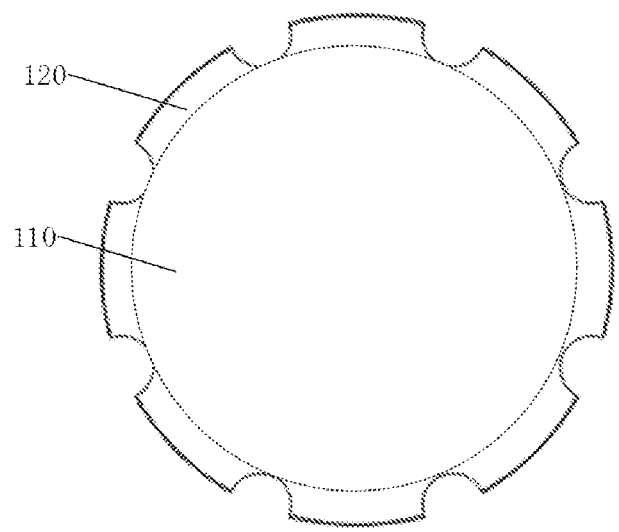
FIG. 2 is a structural schematic diagram from another view angle of a nip roller according to some embodiments of the present application.
Figure 3:
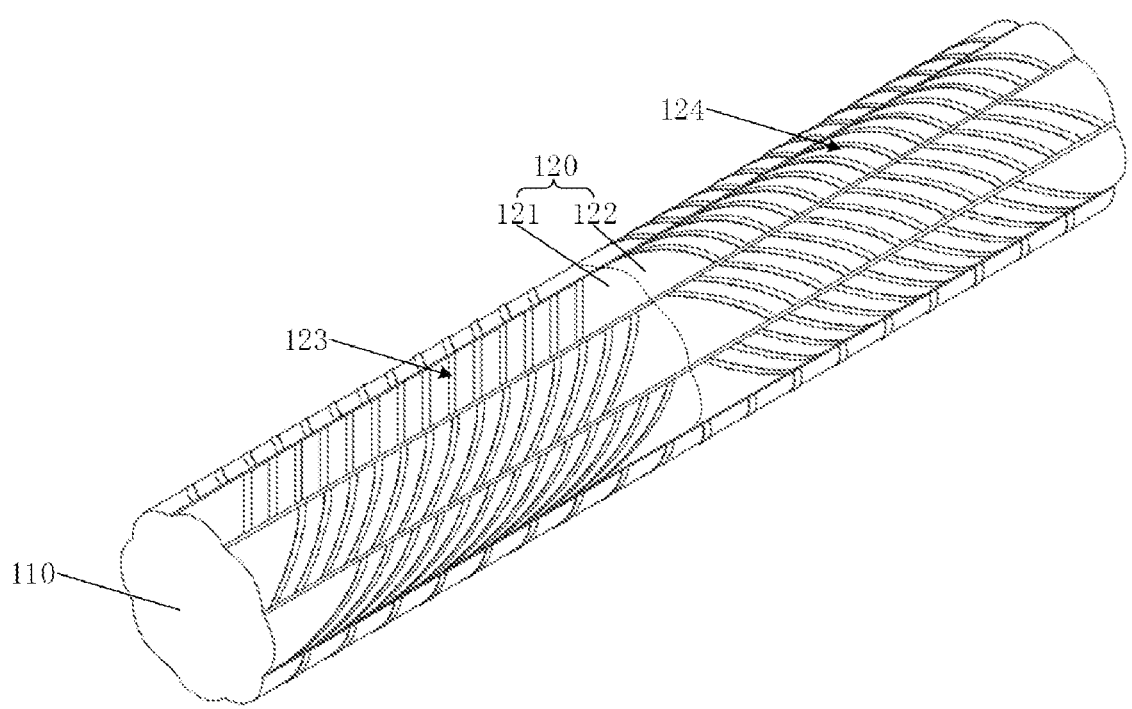
FIG. 3 is a structural schematic diagram of a nip roller according to other embodiments of the present application.
Figure 4:
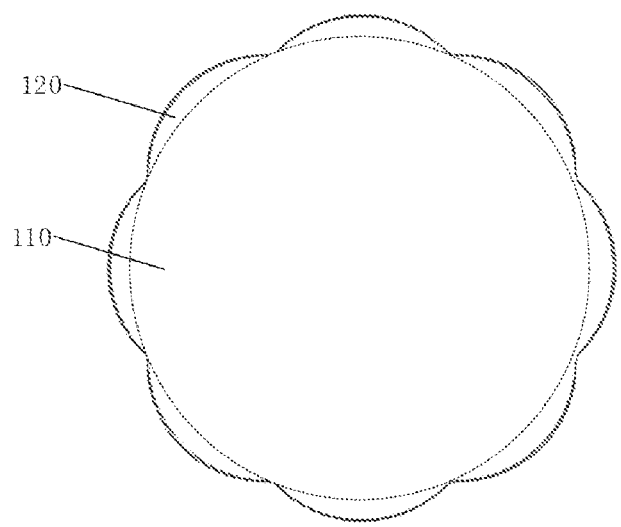
FIG. 4 is a structural schematic diagram from another view angle of a nip roller according to other embodiments of the present application.

Refer to FIG. 1 and FIG. 2. According to some embodiments of the present application, in any ridge 120, the outer surface, away from the axis of the roller body 110, of the ridge 120 is a cambered surface, and intervals between all parts of the cambered surface and the axis of the roller body 110 are the same.

Accordingly, in the process of flattening the pole piece by the nip roller, a time ratio when the pole piece makes contact with the ridges 120 can be increased within unit time, thereby further improving the flattening effect of the nip roller. It needs to be explained that at the time, a transmission mode in which the pole piece is active and the nip roller is driven can be adopted. Specifically, the pole piece being active, and the nip roller being driven indicate that the pole piece does active movement, and when the pole piece does active movement, friction force between the pole piece and the nip roller drives the nip roller to do driven movement. Where the unit time may be one minute, ten minutes, one hour, or the like.

Refer to FIG. 1 to FIG. 4. In some embodiments of the present application, the plurality of first parts 121 are sequentially arranged at intervals in the circumferential direction of the roller body 110; and the plurality of second parts 122 are sequentially arranged at intervals in the circumferential direction of the roller body 110.

Accordingly, in the process of flattening the pole piece by the nip roller, positions, where the pole piece is flattened, of the first threads 123 on the plurality of first parts 121 can be the same, positions, where the pole piece is flattened, of the second threads 124 on the plurality of second parts 122 can be the same, and thus, in the pole piece flattening process, stress of the pole piece is more stable, thereby improving the flattening effect of the nip roller.

According to some embodiments of the present application, referring to FIG. 1 to FIG. 4, the nip roller provided by the present application includes: the roller body 110. The side surface of the roller body 110 is provided with the plurality of ridges 120 protruding in the radial direction of the roller body 110, and the extension directions of the plurality of ridges 120 are all parallel to the axial direction of the roller body 110; each ridge 120 is provided with the first part 121 and the second part 122 which are sequentially arranged in the extension direction of the ridge 120, where the surface, away from the axis of the roller body 110, of the first part 121 is provided with part of the first threads 123, the surface, away from the axis of the roller body 110, of the second part 122 is provided with part of the second threads 124, and the rotation direction of the first threads 123 is opposite to that of the second threads 124; the first threads 123 on the first parts 121 of the ridges 120 are the same in rotation direction, and the second threads 124 on the second parts 122 of the ridges 120 are the same in rotation direction, where the plurality of ridges 120 are sequentially arranged at intervals in the rotation direction of the roller body 110, the lead angles of the first threads 123 on the first parts 121 located on the plurality of ridges 120 sequentially arranged at intervals are sequentially decreased, and the lead angles of the second threads 124 on the second parts 122 located on the plurality of ridges 120 sequentially arranged at intervals are sequentially decreased; the dimensions of the first threads 123 and the second threads 124 in the radial direction of the roller body 110 are all 1 μm-5 μm; the plurality of first parts 121 are sequentially arranged at intervals in the circumferential direction of the roller body 110; and the plurality of second parts 122 are sequentially arranged at intervals in the circumferential direction of the roller body 110.

According to some embodiments of the present application, the present application further provides pole piece flattening equipment including the nip roller in the above embodiments. Since the pole piece flattening equipment provided by the present application includes the nip roller in the above embodiments, the pole piece flattening equipment provided by the present application has the same beneficial effects as the nip roller in the above embodiments, which are not repeated herein.

According to some embodiments of the present application, the present application further provides a pole piece production system including the pole piece flattening equipment in the above embodiments. The pole piece production system provided by the present application includes the pole piece flattening equipment in the above embodiments, the pole piece flattening equipment includes the nip roller in the above embodiments, and thus, the pole piece production system provided by the present application has the same beneficial effects as the nip roller in the above embodiments, which are not repeated herein.

It needs to be explained that in some embodiments, the pole piece production system further includes pole piece cutting equipment, pole piece coating equipment, etc.

Finally, it needs to be explained that the above embodiments are merely used for illustrating rather than limiting the technical solutions of the present application; although the present application has been described in detail with reference to the above various embodiments, those ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of Claims and Specification of the present application. In particular, the technical features mentioned in the various embodiments can be combined in any manner as long as there is no structural conflict. The present application is not limited to the specific embodiments disclosed herein, but includes all technical solutions falling within the scope of Claims.

What is claimed is:

1. A nip roller, comprising:
a roller body, wherein a side surface of the roller body is provided with a plurality of ridges protruding in a radial direction of the roller body, and extension directions of the plurality of ridges are all parallel to an axial direction of the roller body;
each ridge is provided with a first part and a second part which are sequentially arranged in the extension direction of the ridge, wherein a surface, away from an axis of the roller body, of the first part is provided with a first thread structure, a surface, away from an axis of the roller body, of the second part is provided with a second thread structure, and a rotation direction of the first thread structure is opposite to a rotation direction of the second thread structure;
the first thread structure on the first parts of the ridges are the same in rotation direction, and the second thread structure on the second parts of the ridges are the same in rotation direction; and
the plurality of ridges are sequentially arranged at intervals in a rotation direction of the roller body, a number of teeth of the first thread structure on the first parts located on the plurality of ridges sequentially arranged at intervals are sequentially increased, and a number of teeth of the second thread structure on the second parts located on the plurality of ridges sequentially arranged at intervals are sequentially increased.

2. The nip roller according to claim 1, wherein dimensions of the first thread structure and the second thread structure in the radial direction of the roller body are all 1 μm-5 μm.

3. The nip roller according to claim 2, wherein in any of the ridges, a maximum interval between surfaces, away from the axis of the roller body, of the first thread structure and the axis of the roller body is a first interval, a maximum interval between surfaces, away from the axis of the roller body, of the second thread structure and the axis of the roller body is a second interval, and the first interval is equal to the second interval.

4. The nip roller according to claim 2, wherein in any of the ridges, an outer surface, away from the axis of the roller body, of the ridge is a cambered surface, and intervals between all parts of the cambered surface and the axis of the roller body are the same.

5. The nip roller according to claim 2, wherein the plurality of first parts are sequentially arranged at intervals in a circumferential direction of the roller body; and the plurality of second parts are sequentially arranged at intervals in the circumferential direction of the roller body.

6. The nip roller according to claim 1, wherein the nip roller satisfies at least one of:
in any of the ridges, a dimension of the first part in the extension direction of the ridge is 0.6-1 times of a dimension of the second part in the extension direction of the ridge; and
in any of the ridges, the number of teeth of the first thread structure on the first part is smaller than the number of teeth of the second thread structure on the second part.

7. The nip roller according to claim 6, wherein in any of the ridges, a maximum interval between surfaces, away from the axis of the roller body, of the first threads first thread structure and the axis of the roller body is a first interval, a maximum interval between surfaces, away from the axis of the roller body, of the second thread structure and the axis of the roller body is a second interval, and the first interval is equal to the second interval.

8. The nip roller according to claim 6, wherein in any of the ridges, an outer surface, away from the axis of the roller body, of the ridge is a cambered surface, and intervals between all parts of the cambered surface and the axis of the roller body are the same.

9. The nip roller according to claim 6, wherein the plurality of first parts are sequentially arranged at intervals in a circumferential direction of the roller body; and the plurality of second parts are sequentially arranged at intervals in the circumferential direction of the roller body.

10. The nip roller according to claim 1, wherein the nip roller satisfies at least one of:
in any of the ridges, a dimension of the first part in the extension direction of the ridge is equal to a dimension of the second part in the extension direction of the ridge; and
in any of the ridges, the number of teeth of the first thread structure on the first part is equal to the number of teeth of the second thread structure on the second part.

11. The nip roller according to claim 10, wherein in any of the ridges, a maximum interval between surfaces, away from the axis of the roller body, of the first thread structure and the axis of the roller body is a first interval, a maximum interval between surfaces, away from the axis of the roller body, of the second thread structure and the axis of the roller body is a second interval, and the first interval is equal to the second interval.

12. The nip roller according to claim 10, wherein in any of the ridges, an outer surface, away from the axis of the roller body, of the ridge is a cambered surface, and intervals between all parts of the cambered surface and the axis of the roller body are the same.

13. The nip roller according to claim 10, wherein the plurality of first parts are sequentially arranged at intervals in a circumferential direction of the roller body; and the plurality of second parts are sequentially arranged at intervals in the circumferential direction of the roller body.

14. The nip roller according to claim 1, wherein in any of the ridges, a maximum interval between surfaces, away from the axis of the roller body, of the first thread structure and the axis of the roller body is a first interval, a maximum interval between surfaces, away from the axis of the roller body, of the second thread structure and the axis of the roller body is a second interval, and the first interval is equal to the second interval.

15. The nip roller according to claim 14, wherein maximum intervals between outer surfaces, away from the axis of the roller body, of different first thread structure and the axis of the roller body are the same, and maximum intervals between outer surfaces, away from the axis of the roller body, of different second thread structure and the axis of the roller body are the same.

16. The nip roller according to claim 1, wherein in any of the ridges, an outer surface, away from the axis of the roller body, of the ridge is a cambered surface, and intervals between all parts of the cambered surface and the axis of the roller body are the same.

17. The nip roller according to claim 1, wherein the plurality of first parts are sequentially arranged at intervals in a circumferential direction of the roller body; and the plurality of second parts are sequentially arranged at intervals in the circumferential direction of the roller body.

18. A pole piece flattening equipment, the flattening equipment comprising a nip roller, the nip roller comprising:
a roller body, wherein a side surface of the roller body is provided with a plurality of ridges protruding in a radial direction of the roller body, and extension directions of the plurality of ridges are all parallel to an axial direction of the roller body;
each ridge is provided with a first part and a second part which are sequentially arranged in the extension direction of the ridge, wherein a surface, away from an axis of the roller body, of the first part is provided with part of a first thread structure, a surface, away from an axis of the roller body, of the second part is provided with part of a second thread structure, and a rotation direction of the first thread structure is opposite to that a rotation direction of the second thread structure;
the first thread structure on the first parts of the ridges are the same in rotation direction, and the second thread structure on the second parts of the ridges are the same in rotation direction; and
the plurality of ridges are sequentially arranged at intervals in a rotation direction of the roller body, a number of teeth of the first thread structure on the first parts located on the plurality of ridges sequentially arranged at intervals is sequentially increased, and a number of teeth of the second thread structure on the second parts located on the plurality of ridges sequentially arranged at intervals is sequentially increased.

19. A pole piece production system, the production system comprising a pole piece flattening equipment which comprises a nip roller, the nip roller comprising:
a roller body, wherein a side surface of the roller body is provided with a plurality of ridges protruding in a radial direction of the roller body, and extension directions of the plurality of ridges are all parallel to an axial direction of the roller body;
each ridge is provided with a first part and a second part which are sequentially arranged in the extension direction of the ridge, wherein a surface, away from an axis of the roller body, of the first part is provided with part of a first thread structure, a surface, away from an axis of the roller body, of the second part is provided with part of a second thread structure, and a rotation direction of the first thread structure is opposite to that a rotation direction of the second thread structure;

the first thread structure on the first parts of the ridges are the same in rotation direction, and the second thread structure on the second parts of the ridges are the same in rotation direction; and the plurality of ridges are sequentially arranged at intervals in a rotation direction of the roller body, a number of teeth of the first thread structure on the first parts located on the plurality of ridges sequentially arranged at intervals are sequentially increased, and a number of teeth of the second thread structure on the second parts located on the plurality of ridges sequentially arranged at intervals are sequentially increased.

\* \* \* \* \*